(12) United States Patent
Moore

(10) Patent No.: US 7,512,947 B2
(45) Date of Patent: Mar. 31, 2009

(54) SYSTEM AND METHOD FOR EFFICIENT SCHEDULING OF PERIODIC PHENOMENA

(75) Inventor: Sean S. B. Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 1094 days.

(21) Appl. No.: 10/814,604

(22) Filed: Mar. 31, 2004

(65) Prior Publication Data

US 2005/0034126 A1 Feb. 10, 2005

Related U.S. Application Data

(60) Provisional application No. 60/459,057, filed on Mar. 31, 2003.

(51) Int. Cl.
- *G06F 9/46* (2006.01)
- *G06F 15/173* (2006.01)
- *G06F 15/16* (2006.01)
- *H04L 12/28* (2006.01)
- *H04L 12/66* (2006.01)

(52) U.S. Cl. .................. 718/102; 718/100; 718/104; 370/351; 370/356; 709/238; 709/226

(58) Field of Classification Search ............ 712/1; 370/356, 351, 352, 354; 718/102, 1, 100, 718/104, 105; 709/238, 232, 225, 226, 233
See application file for complete search history.

(56) References Cited

U.S. PATENT DOCUMENTS

| | | | | |
|---|---|---|---|---|
| 5,745,778 A | * | 4/1998 | Alfieri | 712/1 |
| 5,845,279 A | * | 12/1998 | Garofalakis et al. | 707/7 |
| 5,964,829 A | * | 10/1999 | Ozden et al. | 718/102 |
| 6,012,080 A | * | 1/2000 | Ozden et al. | 718/102 |
| 6,567,840 B1 | * | 5/2003 | Binns et al. | 718/103 |
| 2003/0219012 A1 | * | 11/2003 | Wisler et al. | 370/356 |

OTHER PUBLICATIONS

Minos N. Garofalakis, Banu Ozden, Avi Silberschatz; On periodic resource scheduling for continuous-media databases; The VLDB Journal (1998) 7: pp.: 206-225.*
Zhang, Hui, et al., Rate-Controlled Service Disciplines, *Journal of High Speed Networks* 3(4), 1994.
Peng, Dar-Tzen, et al., Assignment and Scheduling Communicating Periodic Tasks in Distributed Real-Time Systems, *IEEE Transactions on Software Engineering*, vol. 23, No. 12, Dec. 1997.
Moore, Susan B., et al., Packet Sequencing: A Deterministic Protocol for QoS in IP Networks, *IEEE Communications Magazine*, Oct. 2003.

* cited by examiner

*Primary Examiner*—Meng-Ai An
*Assistant Examiner*—Abdullah Al Kawsar
(74) *Attorney, Agent, or Firm*—Barry W. Chapin, Esq.; Chapin Intellectual Prop Law, LLC

(57) ABSTRACT

The invention described is a system and method for efficient scheduling of periodic phenomena including a collection of methods for modeling and selecting periodic task rates, resource schedule periods, and units of measure for the task and resource periods in scheduling systems such that the systems' schedulers may be improved with respect to performance metrics such as collision avoidance, computational efficiency, and resource utilization.

34 Claims, No Drawings

SYSTEM AND METHOD FOR EFFICIENT SCHEDULING OF PERIODIC PHENOMENA

RELATED PRIOR APPLICATIONS

This application claims priority to Provisional Application Ser. No. 60/459,057 filed Mar. 31, 2003.

FIELD OF THE INVENTION

The present invention relates generally to systems that schedule periodic tasks and, in particular, the schedulers of such systems and the modeling of such systems.

BACKGROUND OF THE INVENTION

The present disclosure presents advancement in the state of the art for scheduled systems, modeled as sets of tasks and resources, in which the tasks are periodic, i.e., a resource must dedicate some required amount of service at some required frequency to the tasks during each resource schedule period. Such systems generally include (1) sets of tasks; (2) sets of resources that service the tasks; and (3) schedulers for assigning resources to tasks, with the attribute that some of tasks need to be serviced periodically. Such systems are embodied in many physical forms, but of immediate relevance to this invention are computer software and hardware systems. The resources may have different service rates/capacities and the tasks may have different frequencies, or equivalently, different periods.

A scheduler or schedulers are responsible for assigning resources to tasks in such a way as to meet some set of system objectives. Such systems span a very broad range of applications, including but not limited to computer operating systems, transportation networks, manufacturing and industrial processes, analog, digital, and optical communication systems, wireless communication systems, packet switched communications networks (e.g., IP networks), cell switched communications networks (e.g., ATM networks), precision counting, sampling, and measuring devices, cryptographic systems, and electromagnetic signaling devices (e.g., magnetic resonance imaging systems). Such systems can be modeled as being composed of periodic tasks, resources, and schedulers.

In such systems, a primary challenge is for the scheduler to find collision-free schedules, i.e., schedules defining which tasks are serviced by which resources at which times such that no more than one task is scheduled for servicing by a resource or set of resources at any time, if such a schedule exists, and such that the resources are highly utilized. An additional challenge is to dynamically add new periodic tasks to the schedule such that the collision-free property of the schedule is maintained. In some environments, e.g., packet switched networks, cell switched networks, and distributed operating systems, an additional complication is the need to coordinate schedules across distributed resources. For example, a packet flow in a packet switched network typically traverses multiple packet switches/routers and interconnecting communication links. The flow needs be scheduled locally at each router, and then the local schedules at each router along the path need to be coordinated in time (scheduled) to provide an end-to-end schedule. Distributed operating systems have a similar challenge in that processes being executed on different hosts need to be globally coordinated in time.

In terms of computational complexity, in general collision-free scheduling problems are NP-hard (intractable) when certain optimality criteria are imposed. The precise definition of an NP-hard scheduling problem is somewhat complex but well understood by those skilled in the art; a practical definition is that an NP-hard scheduling problem is one in which the time needed for an optimal solution method to solve the problem grows exponentially (very) fast with respect to the size of the problem. In practice, optimal solution methods for NP-hard scheduling problems are not used except for when they may be applied to relatively small problems.

As a result, a variety of approximation algorithms for scheduling have been developed to provide near-optimal schedules, and/or certain constraints have been added to the problem to improve the performance of algorithms. See, for example, D. Peng et al. "Assignment and Scheduling Communicating Periodic Tasks in Distributed Real-Time Systems", IEEE Transactions on Software Engineering, Vol. 23, No. 12, December 1997, and the references therein for a survey of periodic scheduling problems and algorithms for operating systems, the disclosure of which is incorporated herein by reference. In the area of packet-switched networks, H. Zhang, D. Ferrari, "Rate-Controlled Service Disciplines", *Journal of High Speed Networks: Special Issue on Quality of Service*, Vol. 3, No. 4, 1994, and the references therein, the disclosure of which is incorporated herein by reference, provide an overview of the state-of-the-art with respect to rate-controlled packet flows, which can be modeled as periodic tasks in packet communication networks. In both the operating systems and packet-switched networks literature, scheduling approximation algorithms that account for and exploit the periodic attribute of the tasks have been described.

Constructing schedules that specify which resources will service which tasks during specific intervals is a difficult problem, whether or not the tasks need periodic servicing. Accordingly, the present invention affords improved computational complexity for computing schedules and affords improved performance of those schedules with respect to resource utilization.

SUMMARY OF THE INVENTION

The present invention relates to a collection of methods for modeling and selecting periodic task rates, resource schedule periods, and units of measure for the task and resource periods in scheduling systems such that the systems' schedulers may be improved with respect to performance metrics such as collision avoidance, computational efficiency, and resource utilization.

The methods disclosed herein are based on a novel theorem in mathematical group theory, the Babylonian Theorem, and a corollary to the Babylonian Theorem, the perfect packing Corollary, that have been stated and proved by the inventor and are disclosed for the first time in this patent application. With a well-chosen set of task periods/rates and/or set of schedule periods and/or units of measure for the periods, the performance of scheduling algorithms that compute collision-free schedules are significantly improved. The task periods, resource schedule periods, and unit of measure may be defined over any of a variety of physical phenomena, such as, but not limited to, time, space, frequency, energy, speed, and mass.

The term "period" is often used in time domains to describe a time interval. In other physical domains, the concept of the interval may not be a time interval but an interval defined over the physical domain. For example, in a spatial domain, an interval may be measured by a length unit, e.g., the meter, along a single axis, and the "periodicity" of a schedule or task may be defined in terms of space, e.g., a task may be to place objects every two meters along another object. Regardless of the physical domain in which the scheduling application is defined, the present invention can be applied. Furthermore, those skilled in the art can readily map the present invention from the physical domains used in the specification of the present invention to any other physical domain. References to "period" may be generalized to an interval in any physical domain; likewise, references to "unit of measure" may be generalized to any physical domain.

Furthermore, because of the periodic nature of the scheduling systems to which the present invention applies, it is often natural to model scheduling system events, measurements, and system values as being indexed by, or defined on, the elements of a mathematical group. A more comprehensive, introductory treatment of group theory may be found in J. B. Fraleigh, *A First Course in Abstract Algebra*, Addison-Wesley, Reading, Mass., USA. November 2002, ISBN 0201763907, incorporated fully herein by reference. For example, if a schedule period measures N units, then events associated with the schedule period, such as when a task will be serviced by a resource, are naturally indexed by the group of integers modulo N. Similarly, tasks that are serviced by a resource are represented by cosets of subgroups of the group representing the resource. Thus, a "resource" or "resource schedule period" is generally represented as a mathematical group, "tasks" or "task service schedules" are represented by cosets of subgroups of the group representing the resource, cosets are defined by a coset representative and a subgroup, and subgroups may be identified with generators of the subgroups. The order of a group representing a resource is the number of elements in the group, and will generally be referred to as "N". For simplification and ease of understanding, throughout the specification of the present invention, indexing by groups of integers modulo N is assumed except where stated otherwise; however, the class of groups of integers modulo N does not include all groups.

In particular, it does not include infinite groups or non-abelian groups, such as permutation groups. For such groups, the concept of a period or rate generalizes to a spectral component. Precisely, by "spectral component" we mean a subgroup of a group, where the subgroup, or spectral component, may be identified by a generator of the subgroup. Some scheduling systems may be structured such that the group or groups over which events and values are naturally indexed are not in the class of groups of integers modulo N. In these cases, versions of the Babylonian Theorem and perfect packing Corollary extended to groups that are not members of the class of groups of integers modulo N, as well as extended versions of the methods described in the specification, may be applied to the scheduling system. Those skilled in the art can readily map the specifications of the methods of the present invention from the class of groups of integers modulo N to other groups including both abelian and non-abelian groups.

The present invention is referred to generally throughout the remainder of this document as Babylonian scheduling.

The present invention is immediately applicable to a broad set of scheduling applications. The embodiment described in the specification applies directly to packet communications networks and cell communications networks, but the invention is not limited to this embodiment, and those skilled in the art can readily map the invention to any system that schedules periodic tasks, or more generally, to any system that schedules tasks that are represented by cosets of subgroups of groups representing the resources. Cell communications networks can be viewed as a special case of packet switched networks in which all packets are the same size, so for the remainder of this description we will refer, for exemplary purposes only, to packet communications networks, but this is not a limitation of the present invention.

Given a set of resources and their respective service rates, and given a set of tasks with varying service requirements, Babylonian scheduling may be used to model and select (1) the set of task periodicities, and/or (2) the resource schedule periods, and/or (3) a unit of measure for task and schedule periods, such that task service requirements are met and such that computation of collision-free schedules is possible, if such schedules exist. An associated scheduling algorithm or algorithms can then be constructed that schedule the resources efficiently and without collisions or that efficiently determine that a collision-free schedule cannot be found using the available computational resources. Individual scheduling system resources with differing service rates may be able to support different sets of collision-free task periodicities; Babylonian scheduling can be used to determine the set of collision-free task periodicities that can be applied to all of the resources simultaneously, as is typically necessary in a packet switched network.

Packet communications networks may be implemented with routers and switches using different architectures. Generally, this invention applies to routers and switches with architectures that support rate-controlled service disciplines. See for example, H. Zhang, D. Ferrari, "Rate-Controlled Service Disciplines", *Journal of High Speed Networks: Special Issue on Quality of Service*, Vol. 3, No. 4, 1994, incorporated fully herein by reference. One type of routing/switching device that supports rate-controlled service disciplines is a packet sequencer, as described in S. Moore, C. A. Siller, Jr., "packet Sequencing: A Deterministic protocol for Ideal QoS in IP Networks", *IEEE Communications Magazine*, October 2003, Vol. 41, No. 10., incorporated herein by reference, and the SQ-1000 and the SQ-50 routing/switching devices available from Cetacean Networks, Inc., of Portsmouth, N.H. A network composed of or partially composed of packet sequencers supports time-deterministic, loss-free communications for IP packet flows and is particularly well-suited to service periodic, and in particular, isochronous packet flows. An isochronous packet flow is a periodic flow with the additional constraint that the packets in the flow are equally spaced with respect to the unit of measure for the system. More generally, tasks may be periodic but are further constrained to be isometric with respect to the underlying mathematical group used to model the system.

Many deployed networks have multiple communications links with different link speeds, and a periodic packet flow (a periodic task) must be serviced periodically by the link resources even when the flow's path includes multiple links with different speeds, or service rates. In the packet sequencing context, the flows are the tasks to be serviced, the network ports/links are the resources that service the tasks, and a software module called the sequence agent functions as the scheduler. The present invention may be used to select sets of periodic rates and/or sets of link schedule periods and/or units of measure that may be applied to all links in the network and that support the design and implementation of scheduling algorithms that display improvement with respect to performance metrics.

Babylonian scheduling is also immediately applicable to other applications, but the IP packet sequencing network will be the concrete example used most often in the present specification. Those skilled in the art can readily map the invention from packet sequencing networks to any application or system that schedules or manages periodic or spectral phenomena.

DETAILED DESCRIPTION OF THE INVENTION

In accordance with the principles of the present invention, a collection of methods, referred to generally as Babylonian scheduling, is disclosed herein that affords efficient schedulers for scheduling periodic tasks with different periodicities across multiple resources with different service rates such that the schedule is collision free, i.e., at most one task is scheduled for servicing by a resource at any given time.

As noted above, the present invention applies to any scheduling system which includes periodic or spectral tasks. The preferred embodiment in this application is a packet communications network or cell communications network (a special case of a packet network), but the present invention is not limited to this embodiment. The preferred embodiment applies to packet networks that use routing and switching devices that support rate-controlled service disciplines. See for example, H. Zhang, D. Ferrari, "Rate-Controlled Service Disciplines", *Journal of High Speed Networks: Special Issue on Quality of Service*, Vol. 3, No. 4, 1994, incorporated fully herein by reference. One such type of device is a packet sequencer. A network composed of or partially composed of packet sequencers is referred to as a packet sequencing network.

A description of packet sequencing networks is detailed in the reference *S. Moore, C. A. Siller, Jr.*, "Packet Sequencing: A Deterministic protocol for Ideal QoS in IP Networks", IEEE Communications Magazine, October 2003, Vol. 41, No. 10 [Moore, Siller], which is hereby incorporated by reference herein in its entirety.

In a typical configuration of a packet sequencing network, a link resource defines time modulo a schedule period, e.g., a network link might define time modulo P, where P=120 ms. Additionally, a link's schedule period is measured in terms of a discrete unit called an appointment, which is typically measured in bytes. Note that the physical domain of the schedule period (time) differs from the physical domain of the unit of measure (the appointment, measured in bytes, or equivalently, mass). Thus, for a 100 Mbps fast Ethernet link with a schedule period of 120 ms and an appointment size of 50 bytes, the schedule period of 120 ms measures 30,000 appointments in size (30,000=120 ms*100 Mbps*(byte/8 bits)*(appointment/50 bytes)).

Network links are connected to packet sequencing devices, which function like conventional IP packet routers but have the additional capability of accepting and enforcing commitments to service packets from individual packet flows at precise times, i.e., at particular appointment times. A device attached to the network or an application hosted by the network can issue a request for a sequenced packet flow, or itinerary, across the network. The request is typically handled by a software module called the sequence agent, which can reside on a network-attached host or can be distributed across the sequencers in the network.

In the more general context of scheduling systems, the sequence agent is the scheduler, which assigns tasks (sequenced flows, or itineraries) to resources (links along the flow's path). The sequence agent knows the topology and link state of the network, and using this information it can compute an itinerary through the network, which is a collection of {appointment(s), sequencer link port} pairs that not only specify a path through the network but also specify the precise times (the appointments) during which each sequencer will service packets from the flow.

In the above scenario, the sequence agent handles requests to find collision-free itineraries through the network for packet flows, i.e., the sequence agent not only finds a path through the network but also finds appointment times on each link in the path that are not already assigned to another flow. Some flows, particularly certain so-called "real-time" flows such as those created by, e.g., a Voice-over-IP (VoIP) networked application, benefit from an itinerary that is strictly isochronous, and not just periodic, i.e., consecutive packets in the flow are serviced during equidistantly spaced time intervals.

For example, a typical G.711-encoded VoIP application with a 20 ms sampling period constructs and sends a packet into the network every 20 ms. If the underlying network can isochronously transport the packets such that the packets are delivered to the destination at precise 20 ms intervals, then the receiving device does not need a jitter compensation buffer. In a VoIP application, jitter compensation buffers contribute to end-to-end latency, which should be minimized; therefore, eliminating jitter compensation buffers through the use of a packet sequencing network that can isochronously transport packet flows helps to minimize end-to-end latency.

Packet sequencers are one example of a more general class of packet routing and switching devices, the class being characterized by the ability to support rate-controlled service disciplines H. Zhang, D. Ferrari, "Rate-Controlled Service Disciplines", *Journal of High Speed Networks: Special Issue on Quality of Service*, Vol. 3, No. 4, 1994. Networks composed of routers and switches in this class generally exhibit improved performance with respect to Quality-of-Service metrics, such as end-to-end delay, delay variation (commonly known as jitter), packet queuing loss, and loss variance, when compared to networks composed of other classes of routing and switching devices.

Because of their time-based forwarding architecture, packet sequencing networks are able to provide an isochronous packet transport service, in contrast to conventional packet routers, which use a contention-based resource sharing model and therefore cannot make hard guarantees for isochronous transport or even periodic transport when there are multiple flows traversing the network and contending for the same resources (e.g., network links).

Other networked applications, e.g., those that do not have a real-time requirement, such as data file transfers, may not directly benefit from isochronous packet transport as much as a real-time application such as VoIP, but using isochronous and/or periodic transport for these other applications provides the following significant benefits to the network as a whole because it potentially:

(1) increases the ability of the network to utilize its resources;

(2) decreases the time the sequence agent uses to compute itineraries; and (3) decreases the time and size of the signaling information that the sequence agent transmits to sequencers to provide them with itinerary information.

All of these benefits are important for controlling the cost, complexity, and performance of the network. By way of example, we examine benefit (3) in the context of the above example of a 100 Mbps fast Ethernet link with a 120 ms schedule period and 50-byte appointments, and therefore 30,000 appointments in each period. Consider a G.711-encoded VoIP flow that sources packets every 20 ms. Each packet uses 238 bytes (a 160-byte G.711-encoded payload, 12-byte RTP header, an 8-byte UDP header, a 20-byte IP header, and a 38-byte Ethernet frame), and therefore requires five (5) contiguous 50-byte appointments for servicing by a link.

In order to provide sufficient throughput for the flow, the sequence agent needs to identify six (6) sets of five (5) contiguous appointments in the collection of 30,000 appointments that are not already committed to other flows, i.e., the link needs to service six VoIP packets every 120 ms. If the sequence agent chooses the location in the schedule of the six appointment sets in some non-isochronous way, e.g., randomly, then the sequence agent would have to signal the sequencer associated with the link with six sets of appointments and their locations.

In contrast, if the sequence agent chooses the six appointment set locations to be equidistant and uniformly distributed across the appointments in the period, i.e., it isochronously schedules the servicing of the flow's packets, then the only information that the sequence agent needs to signal to the sequencer is the first appointment set location (the offset) and the flow rate, i.e., the number of packets to be serviced in the 120 ms period. The sequencer can use local processing resources to simply compute the uniformly spaced locations of the other appointment sets in the link schedule.

In general, if a periodic but non-isochronous appointment selection strategy is used, then the amount of signaling information scales linearly with the number of packets to be serviced in a single schedule period, or the flow rate. In contrast, with an isochronous scheduling strategy, the amount of signaling information is constant and independent of the flow rate. This property becomes critical for reducing signaling overhead in networks supporting high throughput flows and high transaction rates, such as networks hosting a high-quality IP videoconferencing application, which may produce hundreds of packets per flow during every 120 ms link schedule period as well as hundreds of video session setups and teardowns per second.

In general, the modeling of scheduling systems with mathematical groups admits efficient encoding of system information. For example, a periodic task can be represented by a coset of a group, and the coset can fully represented by two values: the generator of the group and a coset representative. Efficient encoding of scheduling system information may be exploited by the system to improve performance.

For a link with N appointments, where N=(link speed*schedule period)/appointment size, the set of possible isochronous flow rates is derived from the power set of the prime factors of N, and this set is equivalent to the set of subgroups of the (additive) group $Z_N$. Specifically, if the prime factorization of $N=p_1 p_2 p_3 \ldots p_j$, then the set of all possible isochronous flow rates, measured in packets per period or equivalently in inter-packet spacing (the flow period), is composed of the $2^j$ values $1, p_1, p_2, p_3, \ldots, p_j, p_1 p_2, p_1 p_3, \ldots, p_1 p_j, p_2 p_3, p_2 p_4, \ldots p_2 p_j, \ldots, p_1 p_2 p_3 \ldots p_j$. (A prime factor may occur more than once in the prime factorization of N, in which case some members of the set will be duplicates.) This set is referred to as the admissible set of task rates for N. The corresponding set of isochronous task periods is referred to as the admissible set of task periods for N.

For a concrete example, consider the case where the schedule period measures N=60, which factors into 2*2*3*5. The admissible set of isochronous flow rates is {1, 2, 3, 5, 4, 6, 10, 15, 12, 20, 30, 60}, where the units are packets per period. The inter-packet spacing, or period, measured in appointments, for a given isochronous packet flow rate is simply computed by dividing N by the flow rate. For example, with N=60 and a flow rate of 4 packets per period, the inter-packet spacing between the leading edge of each packet in the flow is 60/4=15 appointments. Assuming packets that measure one appointment in size, this isochronous flow could be assigned the set of appointments {0, 15, 30, 45}, or the set of appointments {1, 16, 31, 46}, or the set of appointments {2, 17, 32, 47}, etc. Note that when N is a prime number or a number with relatively few prime factors, the set of isochronous flow rates will contain relatively few elements as compared to the set of isochronous flow rates derived from a value of N that is highly composite. Note also that the set of admissible task rates and the set of admissible task periods for a given value of N have the same elements.

As noted earlier, mathematical groups provide an excellent framework for modeling scheduling systems with periodic tasks. A more comprehensive, introductory treatment of group theory may be found in J. B. Fraleigh, *A First Course in Abstract Algebra*, Addison-Wesley, Reading, Mass., USA. November 2002, ISBN 0201763907, incorporated fully herein by reference. In the example above with N=60, a useful group for modeling is the group of integers modulo 60 over the usual operation of integer addition. For this group, an isochronous flow with an inter-packet spacing of 15 appointments and packet measuring one appointment is represented as <15>, the subgroup with generator 15, or {0, 15, 30, 45}, the elements of which are exactly the appointments during which the flow will be serviced by the resource. When the first appointment assigned to the isochronous flow is not 0, then the flow is represented as a coset of the subgroup <15>.

For example, the coset {1, 16, 31, 46} is represented as $<15>_1$ and has a coset representative of 1; the coset {0, 15, 30, 45}, which is also the subgroup <15>, is represented as $<15>_0$, but when the coset representative is 0, the subscript notation may be dropped in accordance with standard notational practice. The elements of a coset represent the appointments during which the resource will service the task, e.g., when the sequencer will forward the packet on the link.

If packets in the flow are larger than one appointment, then contiguous cosets must be assigned to service the flow. For example, a flow with packets as large as two (2) appointments and with a period of 15 appointments need be assigned the coset pair $(<15>, <15>_1)$, or the coset pair $(<15>_1, <15>_2)$, or the coset pair $(<15>_2, <15>_3)$, etc.

Babylonian scheduling measures time modulo P, where P is a schedule period, and in terms of the units of measure (appointments) such that measure of the schedule period is some integer N. Babylonian scheduling constrains the periodicities of the scheduled tasks to values that are derived from the power set of the prime factors of N or from the power set of an integer multiple or integer divisor of N.

Those skilled in the art will understand how to derive the isochronous flow periods for integer multiples or integer divisors of N. Periodic tasks with periods so constrained will be referred to as Babylonian tasks, their periods as Babylonian periods, and their task rates as Babylonian rates. Note that whether a task's period or rate is Babylonian or not depends on the value of N. For example, when N=60, then 4 is both a Babylonian period and a Babylonian rate because it evenly divides 60, but when N=30, then 4 is not a Babylonian period or rate because 4 does not evenly divide 30.

Next is described the basis for an efficient method for avoiding collisions when scheduling Babylonian tasks. Avoiding collisions between Babylonian tasks is equivalent to selecting coset representatives for the tasks that have a particular relationship defined by the Babylonian Theorem. The Babylonian Theorem states that given two tasks with Babylonian periods a and b, respectively, that are assigned coset representatives x and y, respectively, then these tasks $<a>_x$ and $<b>_y$ will collide if and only if $(x-y)$ is evenly divisible by g, where g is the greatest common divisor, or gcd( ), of a and b. The proof of the theorem also includes a simple procedure to determine at which appointments the tasks will collide, i.e., the intersection of $<a>_x$ and $<b>_y$.

A brief example may be helpful. Again we use the above example for a schedule period with N=60, and we assume packet flows with packets no larger than one appointment. Consider a flow "a" with a period of 6 appointments and a flow "b" with a period of 15 appointments. Because gcd(6, 15)=3, cosets should be chosen such that the difference of their representatives is not evenly divisible by three. Choose $<6>_0$ and $<15>_1$; indeed, $<6>_0$ is the set {0, 6, 12, 18, 24, 30, 36, 42, 48, 54}, $<15>_1$ is the set {1, 16, 31, 46}, and the intersection of $<6>_0$ and $<15>_1$ is null, i.e., the flows do not collide. If instead, e.g., $<6>_1$ and $<15>_{10}$ were chosen, then by the Babylonian Theorem the flows will collide because (10−1)=9 is evenly divisible by 3=gcd(6,15). Indeed, $<6>_1$ is the set {1, 7, 13, 19, 25, 31, 37, 43, 49, 55} and $<15>_{10}$ is the set {10, 25, 42, 57}; the intersection of $<6>_1$ and $<15>_{10}$ is {25}, i.e., the tasks $<6>_1$ and $<15>_{10}$ would collide at appointment 25 if they were simultaneously scheduled on the link.

Note also that Babylonian periods can be relatively prime, and therefore flows with such periods cannot share a resource without a collision. In the above example with N=60, 4 and 15 are Babylonian periods, but because gcd(4,15)=1, then the Babylonian Theorem proves that any cosets representing the associated flows will have a non-null intersection (they will collide) because every possible difference of coset representatives is evenly divisible by 1. Also, the Babylonian Theorem indicates that in general it is desirable to schedule flows with Babylonian periods that have a large pairwise gcd( ) value, as this admits more possibilities for cosets with null intersections and should therefore increase the probability of finding such cosets.

If, however, the system is required to support a certain set of rates, then N may be selected such that collisions can be avoided. For example, suppose that there is a requirement to support flows with rates of either 4 or 15, i.e., within a schedule period, flows must be serviced either 4 times per schedule period or 15 times per schedule period. If the unit of measure (the appointment) is defined such that N=60, then the corresponding periods of the flows are 60/4=15 appointments for flows with a rate of 4 and 60/15=4 appointments for flows with a rate of 15. We have already seen that gcd(4,15)=1, so these values of flow rates and N are not sufficient to avoid collisions. However, the appointment size (the unit of measure) may be reconfigured such that N changes to a value that is sufficient to avoid collisions. Equivalently, the group used to index the schedule may be changed. For example, suppose the appointment size is redefined to be half of its original size, in which case the schedule period now measures N=120 appointments, i.e., the group used for indexing has been changed from $Z_{60}$ to $Z_{120}$. Flows that must be serviced 4 times per schedule period now have a period of 120/4=30 appointments, and flows that must be serviced 15 times per schedule period now have a period of 120/15=8 appointments. Because gcd(8,30)=2, it is possible to schedule both types of flows simultaneously without a collision.

As described above, the Babylonian Theorem may be used to detect potential collisions or select schedule period measures that avoid collisions for flows with two different service rates. If, however, there are more than two flow rates in the rate set, then similar logic based on the Babylonian Theorem applies, i.e., given a set of tasks with rates $R=\{r_1, r_2, \ldots r_k\}$ and a corresponding set of flow periods $P=\{p_1, p_2, \ldots p_k\}$, where $p_j=N/r_k$, where N is the measure of the schedule period, then any two flows with coset representatives x and y will not collide if (x−y) is not evenly divisible by g=gcd(P), i.e., the joint greatest common divisor of all of the elements in P.

This observation gives rise to a corollary to the Babylonian Theorem, called the Perfect Packing Corollary, which can be used by a scheduling algorithm to efficiently schedule and utilize link resources. Suppose a system supports flows (tasks) with rate set $R=\{r_1, r_2, \ldots r_k\}$ and a corresponding set of flow periods $P=\{p_1, p_2, \ldots p_k\}$, where $p_j=N/r_k$ on a link with a schedule period of size N. Let g=gcd(P). Then a set of g flows with rates selected arbitrarily from R will not collide if the g flows are uniquely assigned the coset representatives 0, 1, ... g−1. In practice, the Perfect Packing Corollary means that, regardless of the current mix of flows and flow rates, a scheduler does not even have to check if a flow will collide with any other flow if it is uniquely assigned a coset representative in 0, 1, ... g−1. The Perfect Packing Corollary can therefore be used to significantly decrease the computational complexity of scheduling algorithms as well as to define conditions under which a resource can be fully utilized.

The Perfect Packing Corollary is the basis for determining sets of rates that can be exploited by scheduling algorithms to reduce computational complexity and improve resource utilization. For a set of rates R and corresponding set of flow periods P, larger values of g=gcd(P) will afford scheduling algorithms that are able to find collision-free schedules more efficiently than smaller values of g. Thus, R (and therefore P) should be picked such that gcd(P) is large, or conversely, if R is predetermined, then the schedule period and/or the unit of measure should be picked such that gcd(P) is large.

For an illustrative example of rate set selection based on the Perfect Packing Corollary, consider a DS-3 link, which has a payload bandwidth of 44 Mbps, in a packet sequencing network. Suppose that a network engineering team has configured the link with a schedule period of 120 ms and an appointment size of 50 bytes, which yields N=13200 appointments for the size of the schedule period. There is a requirement to support packet flows with rates of up to 60 packets per schedule period, or 60 ppp. The factorization of N=13200 reveals that R, the set of isochronous flow rates no greater than 60 ppp, is {1, 2, 3, 4, 5, 6, 8, 10, 12, 15, 20, 24, 25, 30, 40, 50, 60}, and the corresponding set P of flow periods, measured in appointments, is {13200, 6600, 4400, 3300, 2640, 2200, 1650, 1320, 1100, 880, 660, 550, 528, 440, 330, 264, 220}, which gives g=gcd(P)=22.

Is 22 a good value for g? The answer depends on the requirements of the hosted applications. Consider that the set of applications that the network needs to support includes Voice-over-IP (VoIP) and conventional data traffic. VoIP packets with payloads encoded using G.711 and 20 ms sampling will be larger than 200 bytes, or 4 appointments, but smaller than 250 bytes, or 5 appointments (the exact size depends on the link layer protocol framing), so a scheduler needs to allocate sets of 5 contiguous appointments for VoIP traffic. Data packets can be as large as 1538 bytes (assuming that the Ethernet Maximum Transmission Unit (MTU) of 1500 bytes is a network parameter value), and therefore a scheduler needs to allocate sets of 31 contiguous appointments data traffic. Thus, if the very first flow scheduled across this link is a data flow, then it may be assigned the coset representatives 0, 1, 2, ... 30, which cover all of the values 0 through 21=g−1. Hence, regardless of the rate of the data flow, a scheduler will have to explicitly check for a collision when attempting to schedule any subsequent flow, regardless of the rate of the subsequent flow. This is inefficient.

The set of rates R may be reduced, or restricted, to form a reduced flow rate set R' and corresponding flow period set P' such that gcd(P') is greater than gcd(P). One way to construct such R' and P' sets using Babylonian scheduling is as follows: Because of the requirement to support the 60 ppp rate, 60 is included in R', and the 60 ppp flow rate period, which is N/60=13200/60=220 appointments, is included in P'. The goal is to include elements of P in P' such that gcd(P') is large. One way to do this is to include only those periods in P which are integer multiples of 220, which gives P'={220, 440, 660, 880, 1100, 1320, 2200, 2640, 3300, 4400, 6600, 13200}. By construction, clearly gcd(P')=220. The corresponding flow rates that form R' are exactly those flows rates that evenly divide 60 ppp, or R'={1, 2, 3, 4, 5, 6, 10, 12, 15, 20, 30, 60}.

The effectiveness of the flow rate set construction technique above can be measured as follows: R' contains 12 flow rates, whereas R contains 17 flow rates, or R' has approximately 30% less flow rates than R. But gcd(p')=220 is 10 times larger than gcd(P)=22, or a 1000% increase, one interpretation being that 10 times more traffic can be scheduled before explicit collision checks need to be made. Restricting the system to using R' instead of R will significantly improve the performance of any associated scheduler algorithm. Not only is this restriction minor in the sense that R' is almost as large as R, but also the restriction is readily removed, as follows: note that if system requirements include a flow rate $r_j$ that is in R but not in R', then $r_j$ may be composed from elements in R'. For example, suppose 24 ppp, which is in R but not in R', is a system requirement; then a 24 ppp flow may be synthesized as two evenly spaced 12 ppp flows, where 12 ppp is in R'. More generally, a given flow with a given rate may be synthesized from any combination of flows of different rates such that the sum of the rates of the flows equals the rate of the given flow. This flow rate synthesis method can be applied to any flow rate in R but not in R'; hence, no flow rate has been effectively removed from use. Similarly, a given flow with a given rate may be decomposed into flows with rates that add up to the given rate.

To this point in the specification, only a single resource service rate has been considered. Of course, many real-world scheduled systems schedule tasks against sets of resources that have different service rates. Real-world networks are no exception—they usually contain a variety of links with different speeds, so a single packet flow traversing a network might be transported over links varying significantly in speed.

For example, access links between customer networks and service provider networks are typically DS-1 (1.536 Mbps), DS-3 (44 Mbps), or OC-3 (155 Mbps), and internal network fabric links are typically OC-3, OC-12 (620 Mbps), OC-48 (2480 Mbps), or OC-192 (9920 Mbps) links or 10, 100, 1000, or 10,000 Mbps Ethernet links. If a network of sequencers is interconnected with links of such varying capacities, then one must consider how a packet flow might be transported isochronously from end-to-end.

We know from the discussion above that if a single link has a schedule period measuring N appointments, then the admissible set of isochronous flow rates/periods that can be transported by the link are derived from the power set of the prime factors of N. Now consider two links, each with the same time value for the schedule period and the same size for appointments (e.g., 120 ms and 50 bytes, respectively), but with different underlying link capacities, resulting in two different schedule period measurements, $N_1$ and $N_2$ appointments, for the two links. The isochronous flow periods that can be mutually supported across both links is derived from the power set of the prime factorization of $gcd(N_1, N_2)$. More generally, for a set of k links and a corresponding set of schedule period measures $\{N_1, N_2, \ldots N_k\}$, the isochronous flow rates are derived from the power set of the prime factorization of $gcd(\{N_1, N_2, \ldots N_k\})$.

For example, suppose a network contains DS-3, OC-3, and 10 Mbps Ethernet links, which are configured to have 13200, 27000, and 3000 50-byte appointments respectively per schedule period (which is set to 120 ms for all three link types). Then gcd(13200, 27000, 300)=600, which has a prime factorization 600=2*2*2*3*5*5. Accordingly, the admissible set R of isochronous flow rates that can be mutually supported across these three different link types is composed of all integers that evenly divide 600, or R={1, 2, 3, 4, 5, 6, 8, 10, 12, 15, 20, 24, 25, 30, 40, 50, 60, 75, 100, 120, 150, 200, 300, 600}. Because each link type has a different value of N, the sets of flow periods for each link differ for each link type. Note that in designing and building a network with multiple link types and speeds, the method described earlier for restricting the set of supported flow rates in the single link-speed case may be readily adapted and applied to the multiple link-speed case by those skilled in the art. Note further that the configurations of the number of appointments for each link type in a set of link types with different may be guided by the need for a large gcd( ) value.

The above discussion illustrates the methods of selecting schedule periods and units of measure (appointment sizes) for different link types such that (1) an individual value $N_i$ of appointments per schedule period for link type i has many prime factors and therefore can support a variety of isochronous flow rates; and (2) a set of values $N_1, N_2, \ldots N_j$ for j link types has a greatest common divisor g that itself has many prime factors, i.e., that has a highly composite value of g. In the latter case, a relatively large variety of isochronous flow rates can be supported simultaneously across all of the link types and the greatest common divisors of their corresponding flow period sets are relatively large.

These methods are readily extended from the class of packet communication networks by those skilled in the art to the broader class of scheduled systems with a set of resources of varying service rates across which it is desirable to service periodic tasks with different periods. Also, as noted earlier, even in the case where any flow rate restriction method disallows some flow rates that may be desirable or required by the system, these flow rates can be synthesized from several flows with allowable periods.

Up to this point in the specification, the descriptions of the present invention have been described with regard to the problem of finding coset representatives for a set of tasks, in which the rate attribute of the tasks are chosen from some predetermined set of admissible values, such that the intersection of the corresponding cosets is null. The present invention may also be applied to the inverse problem, stated as follows: Given a set of coset representatives and a set of tasks to which the coset representatives are assigned, what rates may be assigned to each task such that the intersection of the corresponding cosets is null? Those skilled in the art can readily map the methods described above for the problem case of finding coset representatives for a set of tasks with given rates to the inverse problem case of finding rates for a set of tasks with given coset representatives.

Furthermore, those skilled in the art will recognize that the present invention is applicable, but not limited to, schedulers and scheduling systems in the following fields of use: computer operating systems, transportation networks, manufacturing and industrial processes, analog, digital, and optical communication systems, wireless communication systems, packet switched communications networks (e.g., IP networks), cell switched communications networks (e.g., ATM networks), precision counting, sampling, and measuring devices, cryptographic systems, and electromagnetic signaling devices (e.g., magnetic resonance imaging systems). Those skilled in the art can readily map the present invention to a particular field of use.

Modifications and substitutions applied to the present invention by those skilled in the art are considered to be within the scope of the present invention.

The invention claimed is:

1. A method for modeling and structuring a scheduling system, said system including a plurality of tasks, a resource for servicing the tasks, and a scheduler that assigns the tasks to the resource, said method comprising:
    defining tasks as cosets of subgroups of a mathematical group, wherein a coset comprises a subgroup of a group representing a resource;
    defining a resource as said group;
    defining a unit of measure for the resource in such a way as to assign an order, or size, to the group; and
    modeling and structuring the scheduling system using the defined tasks, the resource and the unit of measure;
    wherein given a set of one or more subgroups with task generator values selected from the set $P=(p_1, p_2, \ldots p_k)$, the defining cosets for tasks further comprises selecting coset representatives x and y for any two tasks with subgroup generators $p_i$ and $p_j$, respectively, such that (x-y) is not evenly divisible by $g=\gcd(p_i, p_j)$, where gcd( ) is the greatest common divisor function and where g is the greatest common divisor of $p_i$ and $p_j$, wherein the cosets represent tasks, the groups represent resources, and units of measure are defined over any physical domain, including at least one of the group consisting of time, space, frequency, energy, speed, and mass.

2. The method of claim 1 wherein said system includes at least a first task represented by a coset and associated subgroup and at least a second task represented by a second coset and associated subgroup in which the generator of the second subgroup is different from the generator of said first subgroup.

3. The method of claim 1 wherein said scheduling system includes a plurality of resources.

4. The method of claim 3 wherein said plurality of resources are distributed throughout a physical domain.

5. The method of claim 4 wherein said plurality of resources are represented by groups with at least two different orders.

6. The method of claim 4 in which the unit of measure is chosen such that the corresponding set of orders of the groups representing said plurality of resources has a greatest common divisor that is relatively large.

7. The method of claim 1 wherein a task can be represented by a coset of a subgroup of the group representing a resource, and the coset is represented by first and second values in which the first value includes a generator of the subgroup and the second value includes a coset representative.

8. The method of claim 7 wherein a task is represented by contiguous cosets of a group.

9. The method of claim 1 wherein said system includes a packet switching communications system having periodic scheduled task appointments for servicing a task.

10. The method of claim 1 wherein said act of defining and measuring tasks as cosets and resources as groups includes the act of deriving a set of possible subgroups associated with said cosets from the value of N, the order o the group representing a resource, from the power set of the prime factors of N, where N is the order of said group representing said resource, wherein this set is equivalent to the set of subgroups of the (additive) group $Z_N$ wherein if the prime factorization of $N=p_1 p_2 p_3 \ldots p_j$, then the set of all possible subgroup generators is composed of the $2^j$ values $1, p_1, p_2, p_3, \ldots, p_j, p_1 p_2, p_1 p_3, \ldots, p_1 p_j, p_2 p_3, p_2 p_4, \ldots p_2 p_4, \ldots p_2 p_j, \ldots, p_1 p_2 p_3 \ldots p_j$.

11. The method of claim 1 wherein said system supports tasks represented by subgroups with generator values selected from $P=(p_1, p_2, \ldots p_k)$, wherein P is a schedule period, and further including the act of uniquely assigning coset representatives to the tasks, where said coset representatives are selected from the set of values $(0, 1, \ldots g-1)$, where $g=\gcd(P)$, the greatest common divisor of all of the element values in P.

12. The method of claim 1 wherein said system includes a plurality of resources, said plurality of resources represented by groups with at least two different orders.

13. The method of claim 1 wherein said mathematical group is selected from a set of groups consisting of abelian mathematical groups and non-abelian mathematical groups.

14. The method of claim 1 wherein the set of subgroup generators is restricted to a subset that is smaller than said set of subgroup generators.

15. The method of claim 1 wherein the set of subgroup generators is restricted to a subset that is smaller than said set of subgroup generators.

16. The method of claim 1 in which the groups representing resources are chosen such that the intersection of costs representing tasks will be null.

17. The method of claim 1 in which the unit of measure for a resource is chosen from the group consisting of wherein the set of generator values of all of the subgroups of the group representing said resource are not pairwise relatively prime, and wherein the said set of generator values has a greatest common divisor that is relatively large.

18. The method of claim 1 further comprising encoding system state information using at least one of the group consisting of group, subgroup, and coset notations.

19. The method of claim 1 wherein said scheduler identifies at least one of possible collision events before the possible collision events occur, and elements of a non-null intersection of cosets that represent tasks before such possible events occur.

20. The method of claim 1 wherein given a set of coset representatives, the defining cosets for tasks further includes selecting subgroups with generator values selected from a set $P=(p_1, p_2, \ldots p_k)$, such that for any two tasks with coset representatives x and y, the two subgroups have generators $p_1$ and $p_j$ selected such that (x-y) is not evenly divisible by $g=\gcd(p_i, p_j)$, where gcd( ) is the greatest common divisor function and therefore where g is the greatest common divisor of $p_i$ and $p_j$.

21. The method of claim 1 wherein said system supports tasks with coset representatives uniquely selected from a set of values $(0, 1, \ldots g-1)$, and further including assigning subgroups to the tasks, wherein subgroup generator values are chosen from the set $P=\{p_1, p_2, \ldots p_k\}$ wherein P is a schedule period, and further including selecting the elements in P such that gcd(P), the greatest common divisor of the elements in P, is greater than or equal to g, where g is the joint greatest common divisor of $p_i$ and $p_j$.

22. A computer scheduling system comprising:
    a memory;
    a processor;
    a communications interface;
    an interconnection mechanism coupling the memory, the processor and the communications interface; and wherein the memory is encoded with an application that when performed on the processor, provides a process for processing information, the process causing the computer system to perform the operations of:

providing a plurality of tasks, providing a resource for servicing the tasks, and providing a scheduler that identifies the plurality of tasks with cosets of subgroups of a group representing said resource, where said group is chosen by defining one or more units of measure for the resource in such a way as to index the resource by the elements of said group and wherein said scheduler derives a set of subgroups of said group representing said resource from the power set of the prime factors of N, where N is the order of said group representing said resource, wherein said set is equivalent to the set of subgroups of the group $Z_N$ wherein if the prime factorization of $N=p_1 p_2 p_3 \ldots p_j$, then said set of all subgroups has as task generators the values selected from the set of $2^j$ values, 1, $p_1$, $p_2$, $p_3$, . . . , $p_j$, $p_1 p_2$, $p_1 p_3$, . . . , $p_1 p_j$, $p_2 p_3$, $p_3 p_4$, . . . $p_2 p_j$, . . . , $p_1 p_2 p_3 \ldots p_j$, and wherein a task is represented by a coset of a subgroup, and the coset is represented by first and second values in which the first value includes a generator of the subgroup and the second value includes a coset representative.

23. The system of claim 22 wherein given a set of one or more subgroups with generator values selected from the set $P=\{p_1, p_2, \ldots p_k\}$, the act of defining cosets for tasks further includes the act of selecting coset representatives x and y for any two tasks with subgroup generators $p_i$, and $p_j$, respectively, such that (x-y) is not evenly divisible by $g=\gcd(p_i, p_j)$, where gcd( ) is the greatest common divisor function and therefore where g is the greatest common divisor of $p_i$ and $p_j$.

24. The system of claim 22 wherein said system supports tasks represented by subgroups with generator values selected from $P=\{p_1, p_2, \ldots p_k\}$, wherein P is a schedule period, and further including the act of uniquely assigning coset representatives to the tasks, where said coset representatives are selected from the set of values $\{0, 1, \ldots g-1\}$, where $g=\gcd(P)$, the greatest common divisor of all of the element values in P.

25. A method for modeling and structuring a scheduling system operating in the time domain, said system including a plurality of periodic tasks, a resource for servicing the tasks, and a schedule period associated with the resource, and a scheduler that assigns the set of tasks to the resource, said method comprising:

defining and measuring task periods and said resource schedule period by one or more units of measure in such a way that measurement values for the task periods and the resource schedule period are indexed by elements of a mathematical group and wherein said act of defining and measuring task periods and resource schedule periods identifies the resource with $Z_n$, the group of integers modulo N, where N is the order of the group associated with said resource schedule period, and further includes deriving a set of possible task period values from the power set of the prime factors of N, wherein said set of task period values is equivalent to the set of subgroups of the group $Z_N$ wherein if the prime factorization of $N=p_1 p_2 p_3 \ldots p_j$, then said set of task period values has as elements the $2^j$ values, 1, $p_1$, $p_2$, $p_3$, . . . , $p_j$, $p_1 p_2$, $p_1 p_3$, . . . , $p_1 p_j$, $p_2 p_4$, . . . $p_2 p_j$, . . . , $p_1 p_2 p_3 \ldots p_j$; and modeling and structuring the scheduling system operating in the time domain using said defining and measuring of task periods and said resource schedule period by one or more units of measure.

26. The method of claim 25 wherein said system includes at least a first periodic task having a first period and at least a second periodic task having a second period different from said first period.

27. The method of claim 25 wherein given a set of one or more periodic tasks with rate values selected from $R=\{r_1, r_2, \ldots r_k\}$, where $r_j$ measures the number of service events for a task during a resource schedule period, and a corresponding set of flow periods $P=\{p_1, p_2, \ldots p_k\}$, where $p_j=N/r_j$ and where N is the measure of the resource schedule period, further including selecting and assigning to any two tasks any two rates $p_i$ and $p_j$ and coset representatives x and y such that the intersection of the cosets $<p_i>_x$ and $<p_j>_y$ is null by selecting (x-y) that is not evenly divisible by $g=\gcd(p_i, p_j)$, where g is the joint greatest common divisor of $p_i$ and $p_j$.

28. The method of claim 25 wherein said system supports at least one of the group consisting of tasks with rates selected from a set $R=\{r_1, r_2, \ldots r_k\}$ and task period values selected from a corresponding set $P=\{p_1, p_2, \ldots p_k\}$, where $p_j=N/r_j$, wherein P is a schedule period, and where N is the measure of the resource schedule period, further including uniquely assigning coset representatives to the tasks, where said coset representatives are selected from the set of values (0, 1, . . . g−1), where $g=\gcd(P)$, the greatest common divisor of all of the element values in P.

29. The method of claim 25 wherein said system includes a plurality of resources, said plurality of resources represented by groups $Z_N$ with at least one of the group consisting of at least two different values of N, and at least two different orders for said groups.

30. The method of claim 25 wherein the set of task periods is restricted to a subset that is smaller than said set of task periods.

31. The method of claim 25 in which said resource schedule periods are chosen such that the intersection of cosets representing tasks are null.

32. The method of claim 25 in which the unit of measure for said resource schedule period is chosen from the group consisting of such that the said set of task period values are not pairwise relatively prime and such that said set of task period values has a greatest common divisor that is relatively large.

33. The method of claim 25 in which the unit of measure for said resource schedule period is chosen from the group consisting of such that the said set of task period values are not pairwise relatively prime and such that said set of task period values has a greatest common divisor that is relatively large.

34. The method of claim 25 in which the unit of measure is chosen such that the corresponding set of orders of the groups representing said plurality of resources has a greatest common divisor that is relatively large.

* * * * *